United States Patent [19]

Davis et al.

[11] 3,889,071

[45] June 10, 1975

[54] HANDSET CRADLE

[75] Inventors: John E. Davis, Sun Valley; Wayne E. Bulgrin, Lone Pine, both of Calif.

[73] Assignee: Lockheed Aircraft Corporation, Burbank, Calif.

[22] Filed: Oct. 1, 1973

[21] Appl. No.: 402,633

[52] U.S. Cl. .......................... 179/100 R; 179/146 R

[51] Int. Cl. .......................... H04m 1/02; H04m 1/18

[58] Field of Search ........ 179/100 R, 100 C, 100 L, 179/147, 178, 179, 184, 100 D, 146 R

[56] References Cited

UNITED STATES PATENTS

| | | | |
|---|---|---|---|
| 2,351,125 | 6/1944 | Henrikson | 179/146 R |
| 2,355,464 | 8/1944 | Obergfell | 179/146 R |
| 2,375,681 | 5/1945 | Obergfell | 179/100 R |
| 2,439,218 | 4/1948 | Obergfell | 179/100 R |
| 2,487,016 | 11/1949 | Bescherer | 179/100 R |
| 2,579,878 | 12/1951 | Stone | 179/146 R |
| 3,005,061 | 10/1961 | Cagen | 179/146 R |
| 3,167,617 | 1/1965 | Gerhardt | 179/100 D |
| 3,413,423 | 11/1968 | Stevko | 179/100 D |
| 3,538,267 | 11/1970 | Ross | 179/146 R |
| 3,557,322 | 1/1971 | Walden | 179/100 R |

*Primary Examiner*—William C. Cooper
*Assistant Examiner*—Randall P. Myers
*Attorney, Agent, or Firm*—Billy G. Corber; William Kovensky; Lowell G. Turner

[57] ABSTRACT

An improved cradle for a handset as for telephone use wherein the top end of the handset is normally held between a flat spring and a springloaded release member. Operation of the release member moves it out of the path of motion of the handset out of the cradle, and allows the flat spring to push the upper end of the handset away for easy removal by the operator.

10 Claims, 5 Drawing Figures

HANDSET CRADLE

BACKGROUND AND SUMMARY OF THE INVENTION

This invention relates to an improved handset cradle. More particularly, the invention relates to a cradle for a particular kind of telephone which is particularly adapted for use in vehicles such as ocean-going ships and aircraft. This invention is generally useful to mount handsets for telephone systems and the like, and can be used in any wall type installation, but it has particular utility where the handset is subject to undesirable casual dislocation from the cradle, as in moving vehicles generally.

In modern so-called "Jumbo" commercial airliners, an extensive telephone communication system is required to interconnect the flight deck with one or two positions in each of the passenger cabins, and also with the galley which can be located on a different level. In such airplane telephone systems there is a dual problem. Firstly, the cradle must securely hold the handset, and must be able to withstand substantial forces and yet not permit the handset to become disengaged. The handset for which the invention was developed has a weight of more than 1 pound. In landing and taking off or in severe conditions such as storms or poor landings, the airplane can be subjected to a force of up to about 9 G. This number times the weight of the handset can produce forces in the the order of 12 pounds. A hard object, such as a telephone handset, striking a person with such a force can be dangerous or even fatal. This potential hazard is particularly acute in aircraft in that handsets in airplanes often are mounted close to the seats of the cabin attendants so as to be handy to the crew during takeoffs and landings and at other critical times. The potential danger to the crew members caused by the proximity of the handset must be eliminated.

The second part of the problem is that while securely holding the handset in the cradle it is necessary that the operator be able to easily and quickly remove it for use. The life of a passenger in an emergency situation could depend upon quick access to the telephone. Even in regular service the cabin attendants are extremely busy and cannot afford the time to manipulate knobs, or unscrew holders, or otherwise disconnect the handset from prior art cradles which are secure but which do not permit quick and easy removal and reinsertion.

The invention cradle meets the above two requirements of security yet quick and easy operation in a highly satisfactory manner in actual use, and at the same time provides a large number of other advantages.

The invention has the advantage of excellent human factors; i.e., it is very well designed with regard to facilitating its use. With only a little practice, most people can pull the release member, have their hand positioned to accept the spring driven upper end of the handset, remove the handset from the cradle; and perform all of these steps in one quick, smooth motion.

Another advantage of the invention is that it is extremely simple and economical to manufacture. The cradle is essentially a three-part assemblage of the release member, the spring, and the body. The cradle body lends itself very well to fabrication from nylon using injection molding, which results in a relatively low cost, extremely durable, high quality finished product, having a pleasant appearance, and capable of virtually any coloration.

Means are provided in the cradle to incorporate several additional related items, and these items can vary from one installation to another. The cradle includes means to mount a magnet so that the magnet can operate one or more reed switches built into the handset. These switches automatically operate various means useful in the operation of the telephone network. The cradle also optionally includes a wall which serves as a convenient location for some of these facilities as well as its primary function of an anchor location for the handset wire and a mechanical stop or rest for the hand of the operator when using the cradle.

The cradle includes a relatively large flat spring which normally urges the handset out of the cradle. Counteracting this force is a spring-loaded release member. These two parts of the cradle operate upon the speaker part or upper end of the handset. The cradle includes a shaped opening to snugly receive the foot or microphone part of the handset, which opening is also formed with a clearance space for the telephone cable. The foot end of the handset is free to rock within this opening. In use, the operator pulls on the release member whhich first forces the handset further against the spring to increase the spring load, and then, upon further pulling by the operator, the release member clears the handset entirely which allows the now loaded flat spring to propel the upper end of the handset out of the cradle, on a lower end pivot, thus greatly facilitating the operator's gripping and pulling its lower end out of the bottom end shaped opening.

Thus there is provided a handset cradle of the character described which is lightweight, pleasant in appearance, low cost, maintenance free, strong and durable, highly versatile, and yet efficient and practical to a high degree in use.

BRIEF DESCRIPTION OF THE DRAWINGS

The above and other advantages of the invention will be pointed out or will become evident in the following detailed description and claims, and in the accompanying drawing also forming a part of the disclosure in which

DETAILED DESCRIPTION OF THE DRAWINGS

Figure 1:
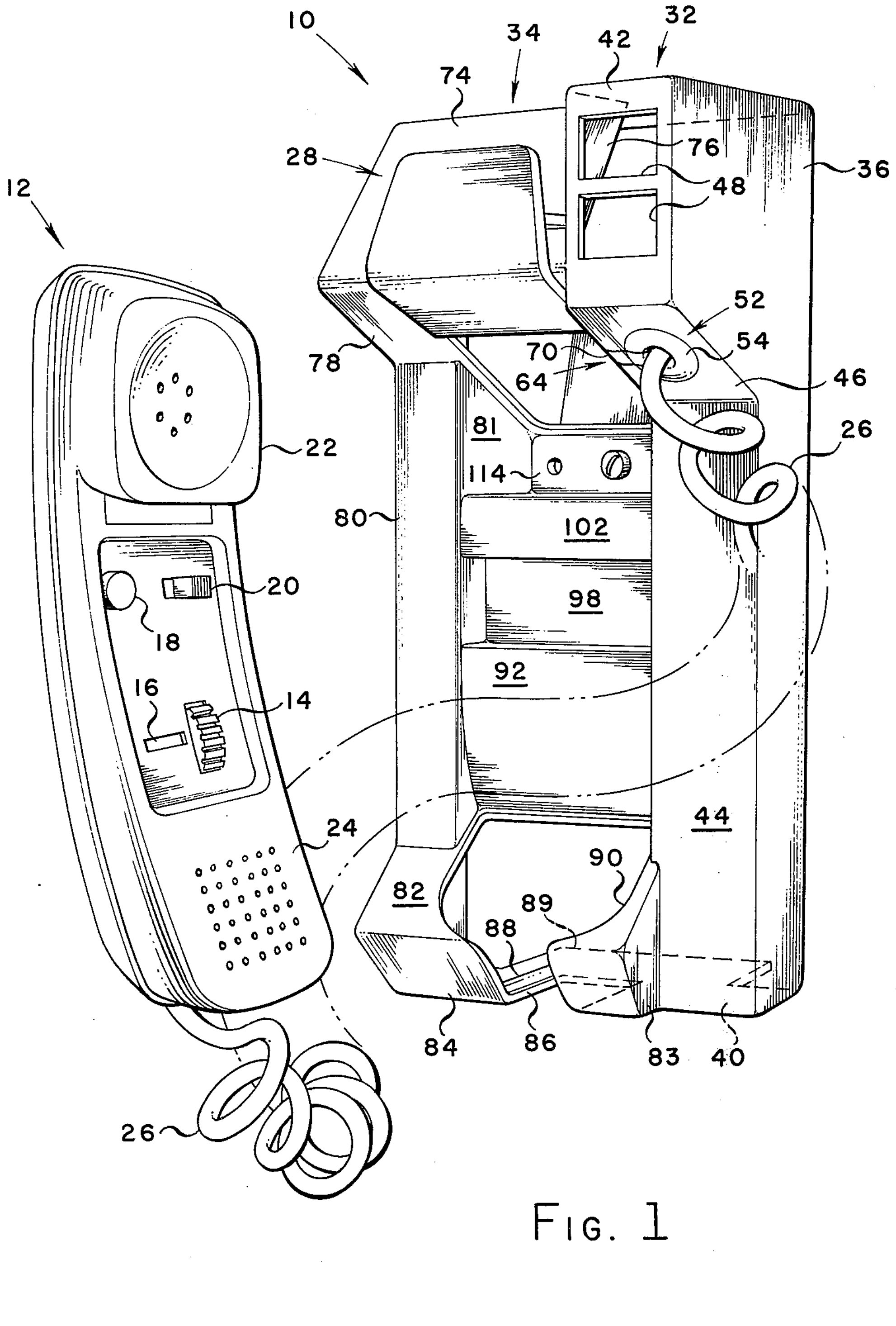
FIG. 1 is a perspective view of the cradle of the invention and a handset telephone for use therewith.

Referring now in detail to the drawings, reference numeral 10 represents a handset cradle embodying the invention. This cradle is designed specifically for use with certain kinds of telephones typified by the instrument 12 shown in FIG. 1. The telephone network in which the invention is being successfully used was custom manufactured, but the handset shell is thought to be the same shell used for handset telephones used in the Bell System and shown and described in detail in U.S. Pat. No. 3,557,322. However, with only minor modifications involving solely dimensioning of parts, the invention cradle can be configured to accept any handset having, even only very generally, the conventional shape of a handle with a receiver on one end and a transmitter on the other. Thus, the handset itself with which the invention is used does not form a material part of the invention.

Accordingly, the term "handset" and the like as used herein shall be understood to include both a conventional handset which is part of a conventional instrument in which most of the apparatus is mounted in the base, and the more modern handset telephones in which the entire telephone is contained in the handset and which typically has an appearance similar to that shown in FIG. 1 of the above-cited Bell patent. Additionally, the term "handset" as used herein shall also include all such devices between these extremes, and all other non-telephone handsets, such as are used in public address systems, or radio telephones, or the like. Any such device shall be analogous in shape to a telephone handset or a handset telephone and must be adaptable for use with the invention cradle.

However, for the sake of enriching the teaching only, the details of the successfully used telephone 12 are shown in FIG. 1. These details include a selector wheel 14 which operates a drum 16 having a plurality of indicia thereon, as well as a rotary switch or the like (not shown) which is incorporated into the telephone circuitry. The handset includes a pushbutton 18 and a selector switch 20 which are connected into the telephone circuitry. This circuitry (not shown) is conventional and/or within the present state of the art, and thus need not be described any further herein.

Handset telephone 12 comprises a conventional earpiece, speaker or listening portion 22, a mouthpiece or microphone portion 24, and a cable 26 which connects the handset 12 to the cradle 10 as shown. The handset 12 also includes a pair of conventional reed switches 13 which are located in the shank of the instrument between the locations of the switches 18 and 20 and the earpiece 22. These switches are operated by magnet means in the cradle which will be described in detail below. One of these reed switches deactivates the telephone's audio circuits when the handset is in the cradle and the other deactivates a call light and/or other alerting means when the handset is removed from the cradle.

Cradle 10 is primarily a unitary body having a release member assembly 28 and a flat spring 30 (FIGS. 2–4) mounted thereon. The main body can be artificially divided into a right hand wall portion 32 and a cradle portion 34 which comprises the remainder of the unitary body. This division of the portions 32 and 34 has been made solely for convenience in this description, it of course being understood, as is best shown in FIG. 4, that the cradle body is all one piece.

In an airplane it is necessary that the telephone wire be "dressed;" i.e., up out of the way and not susceptible to being snagged or catching on people or things when the handset is in the cradle. Thus, for the successfully constructed embodiment of the invention, the primary function of the right hand wall portion 32 with its high wire anchor is to dress the cable 26. In other embodiments, such as in the home or in other vehicles where there is more room, the right hand wall can be eliminated, the cable anchored in the bottom wall, and the entire cradle be reconfigured to be symmetrical, the entire appearance being analogous to that of the cradle shown in the above-identified Bell patent.

Figures 4, 5:
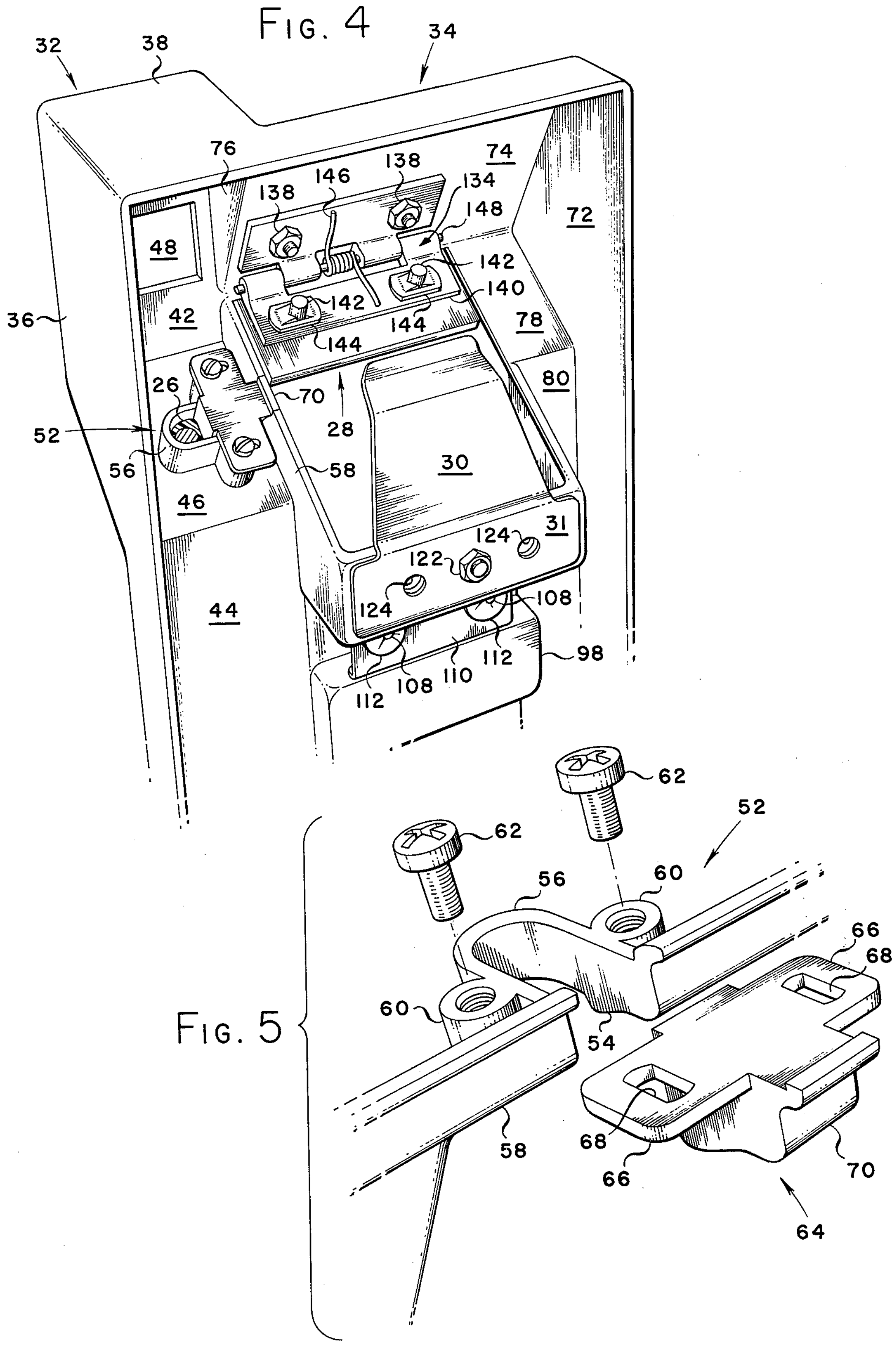
FIG. 4 is a rear perspective elevational view of the upper end of the cradle of FIG. 1.
FIG. 5 is an exploded perspective view of the clamp assembly.

Referring to FIGS. 1 and 4, the portion 32 comprises a side wall 36, a top wall 38 which is shared with the cradle portion 34, a bottom wall 40 similarly defining the entire bottom of the cradle, and a front wall divided into three segments. These three segments comprise a top wall portion 42, a bottom wall portion 44, and an inclined wall portion 46 interconnecting portions 42 and 44. The top wall portion 42 is formed with a pair of openings 48 which serve as a convenient location at which to mount other items. The holes 48 are shown empty in the drawing for the sake of clarity. In the successfully constructed embodiment of the invention used on an airliner, a pair of switches were mounted in the openings 48, one for the cabin attendant's personal light, and the other for a light in another part of the aircraft. These holes could have other shapes, other items could be mounted therein, such as a channel selector, or a main on-off switch, or a push-to-talk switch, or the like, or the top wall portion 42 could be solid.

Bottom wall portion 44 serves primarily as a rest for the coiled telephone cable 26 when the handset 12 is in the cradle, as mentioned above. The provision of this portion 44 having a width slightly larger than the outside diameter of the coils of cable 26 yields the advantage of an enhanced appearance in that the entire assemblage of cradle, handset and cable has a more unified or modular impact upon a viewer.

The inclined wall portion 46 serves primarily as an anchor for the cradle end of cable 26. Its angle, as shown, positions the cable to hang substantially vertical downwardly. A cable clamp assembly 52 is provided in wall 46 and comprises a molded-in boss portion 54 on the outside surface of wall 46, and a slot defining a molded-in U-shaped protruding wall 56. The curve in wall 56 defines approximately half of the central opening defined by boss 54 on the opposite side of wall 46. The legs of the U-shaped wall 56 extend to the inside edge of the right hand wall portion 32 and their ends are integral with a wall 58 forming part of the cradle portion 34, described below. On the rear side of wall 46 and to either side of the U formed by wall 56, a pair of integral studs 60 are provided, as shown in FIG. 5. Each stud is fitted with a metal threaded sleeve (not shown), each of which receives a screw 62.

A separate cable locking pressure foot 64 is provided and comprises a pair of flanges 66, each of which is formed with an elongated slot 68 which receives a screw 62. The body portion 70 of the pressure foot 64 extends frontwardly from the plane of the flanges 66 and is positioned to fit snugly inside of the legs of the U-shaped wall 56. The sides of body 70 taper slightly inwardly from rear to front to facilitate molding the foot, and to make a tight fit of body 70 in wall 56 to avoid any slop. The front face of the body portion 70 is shaped and treated to blend unobtrusively with the other front surfaces of the cradle.

The operation of the clamp assembly 52 is now obvious, the cable is first passed through the slot defined by wall 56, and then the pressure foot 64 is positioned in the slot and secured firmly against the cable by means of the locking screws 62. In this simple manner, a large force sufficient to securely hold the cable in normal use is easily developed, while at the same time the facility to easily remove the cable, as for servicing, is provided via simply removing the screws and the entire pressure foot 64.

Figure 2:
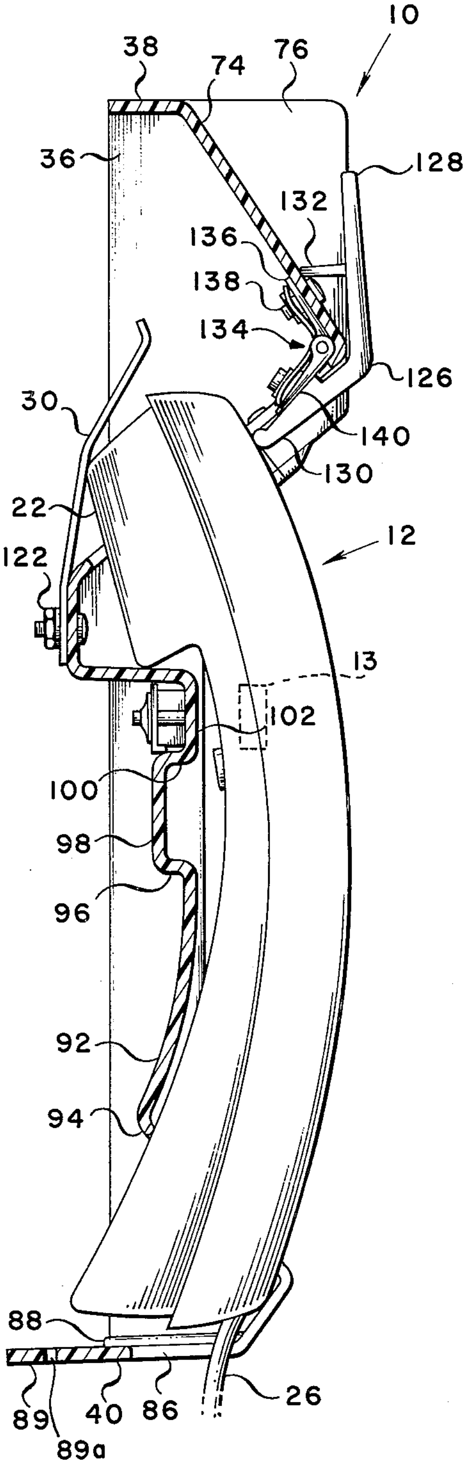
FIG. 2 is a side-elevational view of the cradle with the handset therein taken from the left side of FIG. 1 and with some parts broken away and in cross-section.

The cradle portion 34 comprises a side wall 72 which extends top-to-bottom and interconnects the left hand sides of the top and bottom walls 38 and 40. A top inclined wall 74 extends downwardly from top wall 38, and its right side is joined to top wall portion 42 by a triangular shaped wall portion 76. Next a relatively small inclined wall 78 is joined to the front protruding end of wall 74, and this wall 78 is at substantially the same angle as inclined wall portion 46 to thereby produce a feeling of continuity from side-to-side of the cradle overall. Similarly, a long side wall 80 is co-planar with wall 44 and likewise aids in producing the cradle's unitary appearance. A pair of inclined walls 82 and 84 repeat the effect of the upper two walls 74 and 78 and define the foot end of the cradle which receives the mouthpiece end 34 of the handset 12. A small truncated triangular wall 83 joins the left hand edges of the walls 82 and 84 to bottom wall portion 40, as best shown in FIGS. 1 and 2. The bottom wall 40 is partially cut out as at 86 to clear the cable 26. To strengthen the cradle at the bottom wall cut out 86 a pair of flanges 88 are provided, one to either side of the cut out. Bottom wall 40 is formed with a mounting flange portion 89 which extends outwardly beyond the plane defined by the inside edges of the four outermost walls 36, 38, 40 and 72. This flange may be formed with holes 89*a* as shown, or may carry other conventional mounting devices. The opening of cut out 86 continues through wall 84, smoothly tapering slightly increasingly outwardly to facilitate the cable motion therethrough, and thereafter, in wall 82, the opening 90 enlarges out to substantially the full distance between walls 80 and 44 to snugly receive the mouthpiece end of the handset.

An important function of the bottom wall 40 with its reinforcing flanges 88 is to define a bottom insertion position which locates the entire handset 12 with respect to the upper end release means to thereby facilitate the easy and precision motion between the upper end of the handset and the release means. This lower end locating feature is also important when removing the handset in that it precludes the possibility of the handset falling out of the cradle entirely when its upper end is spring driven out and before it can be grasped by the user.

The versatility of the invention in regard to accommodating different handsets should now be clear. In molding a cradle for some other handset, this opening 90, and the companion earpiece opening at the upper end and described below, are simply reconfigured and redimensioned to accept such other handset. This is, only this middle part of the cradle between the walls 80 and 44 need be reworked and redimensioned.

A curved wall 92 extends upwardly from the upper end of opening 90, and is formed with a small diameter curved filler portion 94 which strengthens the structure, enhances the appearance and adapts to the contour of the handset. Curved wall 92 serves to guide and direct the lower end of the handset into opening 90 as the handset is replaced in the cradle. At the upper end of wall 92, a ledge 96 joins a depressed vertical wall 98, and another ledge 100 interconnects the upper end of that wall with a similar forwardly disposed vertical wall 102. The depressed well formed by parts 96, 98 and 100 serves as a convenient central location for the molding sprue, a stiffener for the overall structure, provides clearance for pushbutton 18, and as a desirable location in which to insert a nameplate, a station location identifier, and/or similar means. Such nameplates or the like inserted into the well also serve to hide the molding sprue, finishing marks, and the like.

An elongated horizontally disposed ledge 104 extends inwardly from the upper end of vertical wall 102, and serves as a rest location for the lower corner of the earpiece of the handset as shown in FIG. 2. The rearwardly facing well formed by wall 102 and ledges 100 and 104 serves as a mounting location for a small permanent magnet 106. Magnet 106 is located and held in this wall without any effect on the front surface of the cradle by means of a pair of molded-in rearwardly extending posts 108. The magnet 106 is held against wall 102 by a hold-down plate 110 which is formed with clearance openings to receive the posts 108. The assemblage of parts 106, 108 and 110 are firmly held together by a pair of friction nuts 112 or the like. Devices 112 are of the type which have a small central opening and a plurality of cuts to thereby define fingers surrounding the opening. When pushed over the post 108, these fingers bite into the plastic to thereby produce a permanent secure structure.

At the inside end of ledge 104 and wall 114 extends vertically upwardly parallel to the walls 98 and 102. Wall 114 has a fillet at its upper end which defines the lower end of the opening 116 for the upper earpiece end of the handset. The upper end of this opening is defined by a fillet 118 formed at the bottom end of inclined wall 74. The various portions 92 through 114 inclusive between the upper and lower openings 90 and 116 for the two ends of the handset are joined to the long thin walls 44 and 80 by vertically disposed complex shaped walls 81 and 45 respectively. Walls 81 and 45 have portions extending both to the front and back of the composite front face of portions 92 to 114. The portions 92 to 114 define a composite surface which is entirely depressed from the plane defined by the side walls 44 and 80, and the two walls 81 and 45 serve to join the ends of these various portions to the two side walls to thereby complete the structure.

Figure 3:
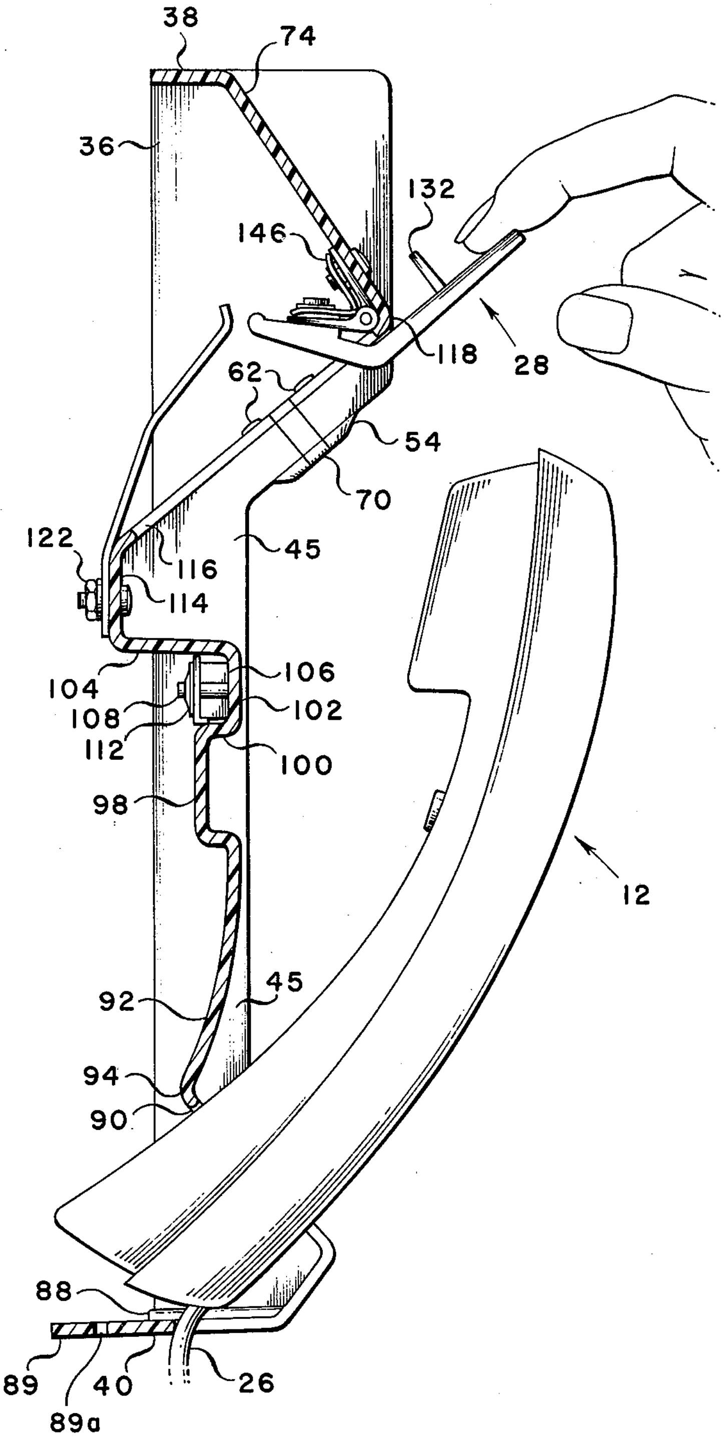
FIG. 3 is a view similar to FIG. 2 showing the handset snapped out of the cradle.

Means are provided to hold the handset securely in the two openings in the cradle while at the same time permitting the user to both remove and replace the handset quickly and easily. To this end, there is provided a release member assembly 28 which is fixed to wall 74 at the upper front end of opening 116, and the spring member 30 which is fixed to wall 114 at the lower inside end of opening 116. Spring 30 is made of a generally flat piece of spring steel of generally trapezoidal shape, bent as shown in FIGS. 3 and 4 and having a flange portion 31 which is fixed to the inside of wall 114 by means of a nut, bolt and lock washer assembly 122. A pair of registering openings 124 are provided in both flange 31 and wall 114 and serve, in cooperation with the holes or other means in mounting flange 89, as the means by which the cradle is secured to a suitable bracket or wall or straps or the like (not shown) at the location where the handset is to be positioned. The mounting of the cradle is otherwise conventional.

The release assembly 28 comprises a generally V-shaped operating member 126 having an upper leg 128 and a lower leg 130. The upper leg is formed with an integral stop 132 which bears against the front face of wall 74 in the FIG. 2 position of the cradle, as well as in the position of the cradle where the handset is removed and the member 126 is undisturbed. Means are provided to normally urge the member 126 to the FIG. 2 position, see FIGS. 2 and 4, and these means comprise a hinge 134 having an upper leaf 136 fixed to the inside of wall 74 by a pair of locking nuts, bolt and washer assemblies 138. The second leaf 140 of hinge 134 is fixed to the inside surface of lower leg 130 of member 126 and provides its sole support. Leaf 140 is fixed to leg 130 by means similar to post 108 and friction nuts 112, and to this end therefor comprise posts 142 on the inside of leg 130, and a pair of friction nuts 144 cooperative therewith and with the inside surface of hinge leaf 140. A torsion spring 146 is provided about the pin 148 of the hinge 134, and normally urges the parts to the FIG. 2 position.

Basically, the operation of the invention cradle includes retention of the upper end of a handset between spring means equivalent to spring 30 and spring-loaded release means equivalent to operating member 126. Accordingly, a push bar, which some designers feel is more desirable from a human factors point of view, could be substituted in wall 74, and this bar could operate a bell crank or other linkage system which would in turn operate some handset retainer member equivalent to lower leg 130 of release member 126. Similarly, other means such as a rotary release, or a lever held in a slot, or the like, could be used in lieu of member 126. Thus, in summary, the handset releasing means could take other configurations so long as the result is completely secure retention of the handset, and a spring bias to permit easy insertion of the handset into the cradle.

While the invention has been described in detail above, it is to be understood that this detailed description is by way of example only, and the protection granted is to be limited only within the spirit of the invention and the scope of the following claims.

We claim:

1. A wall-mountable cradle for a telephone handset comprising a body formed with upper and lower forward-facing openings to receive the two ends of the handset, a bottom wall defining the bottom of said lower opening to locate the handset in the body, spring means at the inside of said upper opening adapted to urge the upper end of said handset out of said upper opening, release means at the upper front end of said upper opening, said release means having a first position wherein it secures the upper end of said handset against said spring means and a second position wherein it is substantially clear of the normal path of motion of said upper end of said handset in and out of said opening, and means to normally bias said release means to said first position.

2. The combination of claim 1, said spring means comprising a flat spring member consisting of spring steel, and means to position said spring member at the lower inside end of said upper opening.

3. In combination with the cradle of claim 1, a handset, said handset having two ends including at least one reed switch located at a predetermined position between said two ends for activating at least an audio function thereof, a magnet in said cradle body, means to mount said magnet in said body between said upper and lower openings therein and at a location thereon where said magnet cooperates with said reed switch in said handset to operate the same only when said handset is in said cradle.

4. The combination of claim 1, said body comprising a one-piece plastic molding.

5. The combination of claim 1, and at least one utility opening formed in said body at a location thereon which is unobstructed when said handset is mounted in said cradle, and at least one utility item mounted in said at least one opening.

6. In combination with the cradle of claim 1, a telephone handset, a mounting flange extending rearwardly out beyond said handset when said handset is mounted in said cradle, and additional mounting means in said body at positions thereon which are covered by said handset when said handset is mounted in said cradle, said mounting flange and said additional mounting means being provided for wall mounting said cradle.

7. A wall-mountable cradle for a telephone handset comprising a body formed with upper and lower forward-facing openings to receive the two ends of the handset, a bottom wall defining the bottom of said lower opening to locate the handset in the body, spring means at the inside of said upper opening adapted to urge the upper end of said handset out of said upper opening, release means at the upper front end of said upper opening, said release means having a first position wherein it secures the upper end of said handset against said spring means and a second position wherein it is substantially clear of the normal path of motion of said upper end of said handset in and out of said opening, and means to normally bias said release means to said first position, said release means comprising a release member of V-shaped configuration having a first leg extending upwardly and forwardly of said upper opening, means on said first leg cooperative with said body to define said first position, said V member having a second leg extending into said upper opening, the inside free edge of said second leg being adapted to bear against said handset in said first position, hinge means having a leaf connected to the inside surface of said second leg and a second leaf connected to the inside surface of said body at the top of said upper opening, said biasing means comprising torsion spring means in said hinge means to urge said release member to said first position, whereby a pulling force on the upper free end of said first leg of said release member away from said body will pivot said second leg of said release member about said hinge means and out of the path of motion of said handset out of said opening under the influence of said first mentioned spring means.

8. A wall-mountable cradle for a telephone handset comprising a body formed with upper and lower forward-facing openings to receive the two ends of the handset, a bottom wall defining the bottom of said lower opening to locate the handset in the body, spring means at the inside of said upper opening adapted to urge the upper end of said handset out of said upper opening, release means at the upper front end of said upper opening, said release means having a first position wherein it secures the upper end of said handset against said spring means and a second position wherein it is substantially clear of the normal path of motion of said upper end of said handset in and out of said opening, and means to normally bias said release means to said first position, and a cable interconnecting said handset and said cradle, said lower opening in said cradle body comprising a cutout extending from the bottommost portion of said lower opening into said bottom wall of said cradle to clear said interconnecting cable when said handset is in said cradle, and reinforcing flanges on said bottom wall in closely spaced relation to the edges of said cutout.

9. A wall-mountable cradle for a telephone handset comprising a body formed with upper and lower forward-facing openings to receive the two ends of the handset, a bottom wall defining the bottom of said lower opening to locate the handset in the body, spring means at the inside of said upper opening adapted to urge the upper end of said handset out of said upper opening, release means at the upper front end of said upper opening, said release means having a first position wherein it secures the upper end of said handset against said spring means and a second position wherein it is substantially clear of the normal path of motion of said upper end of said handset in and out of said opening, and means to normally bias said release means to said first position, a cable interconnecting said handset and said cradle, combined mounting and securing means in said body to join the cradle end of said cable to said body, said combined means comprising a downwardly facing wall portion of said body, an opening formed in said wall portion and adapted to pass said cable therethrough, a molded-in boss portion on the front face of said wall surrounding said opening, a U-shaped wall on the opposite side of said wall portion from said boss portion and surrounding about half of said opening, a pressure foot having a portion adapted to fit between the legs of said U-shaped wall and having a front face which matches the front surface of said downwardly facing wall portion, and means to secure said pressure foot at selected adjustable positions between said legs of said U-shaped wall to thereby secure said cable between said pressure foot and the curved portion of said U-shaped wall.

10. A wall-mountable cradle for a telephone handset comprising a body formed with upper and lower forward-facing openings to receive the two ends of the handset, a bottom wall defining the bottom of said lower opening to locate the handset in the body, spring means at the inside of said upper opening adapted to urge the upper end of said handset out of said upper opening, release means at the upper front end of said upper opening, said release means having a first position wherein it secures the upper end of said handset against said spring means and a second position wherein it is substantially clear of the normal path of motion of said upper end of said handset in and out of said opening, and means to normally bias said release means to said first position, said securing means comprising a pair of studs molded in said body to opposite sides of the legs of said U-shaped wall, a flange extending from said pressure foot to each side of said U-shaped wall to overlie said studs, an elongated slot in each of said flanges, and locking screw means in said slots to secure said flanges at any selected adjusted position of said pressure foot with respect to said studs.

* * * * *